(12) United States Patent
Reimers

(10) Patent No.: US 7,332,058 B2
(45) Date of Patent: Feb. 19, 2008

(54) HEAT EXCHANGER AND PROCESS FOR DEVOLATILIZING POLYMERS USING SAME

(75) Inventor: Jay Reimers, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 602 days.

(21) Appl. No.: 10/632,213

(22) Filed: Jul. 31, 2003

(65) Prior Publication Data

US 2005/0022939 A1 Feb. 3, 2005

(51) Int. Cl.
  *B01D 1/00* (2006.01)
  *F28F 1/00* (2006.01)
(52) U.S. Cl. .................. 159/47.1; 159/2.1; 159/23; 159/27.1; 159/27.3; 159/28.6; 159/DIG. 10; 159/DIG. 15; 159/DIG. 32; 165/165; 165/166; 165/167; 165/179; 528/501
(58) Field of Classification Search .............. 159/2.1, 159/23, 47.1, 27.1, 28.6, 27.3, DIG. 10, DIG. 32, 159/DIG. 15; 165/165–167, 172–176, 179; 528/501
See application file for complete search history.

(56) References Cited

U.S. PATENT DOCUMENTS

| 4,747,915 A * | 5/1988 | Pagani ..................... 203/89 |
| 4,808,262 A | 2/1989 | Aneja et al. .............. 159/47.1 |
| 4,834,172 A * | 5/1989 | Duran ..................... 165/143 |
| 4,865,689 A * | 9/1989 | Hon ....................... 159/13.2 |
| 5,084,134 A | 1/1992 | Mattiussi et al. ......... 159/47.1 |
| 5,632,797 A * | 5/1997 | Williams .................. 65/413 |
| 6,353,088 B1 * | 3/2002 | Fujitaka et al. ........... 528/501 |
| 6,485,607 B1 | 11/2002 | Elsner et al. ............. 159/2.1 |

FOREIGN PATENT DOCUMENTS

EP 0359432 B1 2/1994

* cited by examiner

*Primary Examiner*—Virginia Manoharan
(74) *Attorney, Agent, or Firm*—Tenley R. Krueger

(57) ABSTRACT

Disclosed is a process for devolatilizing a polymer including passing the polymer through a devolatizer including a plate heat exchanger wherein the plates of the plate heat exchanger are heated by a plurality of heating tubes and wherein the heating tube including a return tube nested inside of a supply tube. The use of the disclosed invention allows for a comparatively small heat profile across heating plates as compared to prior art plate heat exchangers.

15 Claims, 1 Drawing Sheet

HEAT EXCHANGER AND PROCESS FOR DEVOLATILIZING POLYMERS USING SAME

BACKGROUND OF THE INVENTION

1. Field of the Invention

The present invention relates to heat exchanger. The present invention particularly relates to a heat exchanger for use in devolatilizing polymers.

2. Background of the Art

Polymers are a major article of commerce in a wide variety of industries. They are used in the manufacture of houses and automobiles. Polymers are also widely used in the practice of medicine where they are incorporated into articles such as syringes, plasma bags, specimen holders, and protective garments. Polymers are even used in the distribution of foodstuffs wherein the polymers, for example, can serve to protect food from contamination and spoilage.

Many polymers are produced using solvents, low molecular weight monomers, or both. For example, polystyrene can be prepared using solution or bulk polymerization. In the process of preparing polystyrene, the polymerization reaction is typically discontinued when polymerization of 40 to 90 percent by weight of monomer is obtained. The unreacted monomer and volatile substances remaining in the resultant polymer, and solvent also remaining in the polymer in the case of the solution polymerization, are desirably separated. It is especially desirable to remove residual volatile components in the case of styrene polymer used for food containers or the like.

When performing a devolatilization operation, it can often be important to avoid exposing the polymer being treated to excessive temperatures and even to moderate temperatures for too long a period of time. The possible results of failing to do so can be excessive polymer molecular weight, undesirable crosslinking, or even thermal polymer degradation.

In order to remove the volatiles from polymers and polymer solutions, an apparatus for removing volatile components is employed. For example, EP 0 359 432 B1 to Morita, et al., discloses the use of a heat exchanger for giving a polymer solution an amount of heat necessary for the evaporation of the volatile components and also heating the polymer solution after the evaporation of the volatile components to maintain adequate fluidity of the polymer, a devolatilizer for causing evaporation of volatile components contained in the polymer solution a vacuum source, and a distributor located between the heat exchanger and devolatilizer.

In the case of highly viscous polymers, another approach is disclosed in U.S. Pat. No. 4,808,262 to Aneja, et al. Therein it is disclosed to use a plate heat exchanger to wherein the polymer is heated along a short zone of indirect heat exchange. It is further disclosed that the residence time within the zone of indirect heat exchange ranges from approximately 5 seconds to 120 seconds.

The use of plate heat exchangers is also disclosed in U.S. Pat. No. 5,453,158 to Cummings, et al. Therein, it is disclosed to use a polymer devolatilization apparatus including a flat plate heater having a multiplicity of flat plates defining a plurality of channels, each channel having a substantially uniform height but varying width over its length, each channel including three zones. The a first zone is described as being in operative communication with the polymer solution supply device, characterized by decreasing width as a function of distance from its beginning. The second zone is described as beginning at the terminus of the first zone, and characterized by at least one occurrence of a restrictive cross-sectional area. The third zone is described as beginning at the end of the second zone and terminating at a liquid/vapor collection and separation region operating at reduced pressure, and being characterized by increasing width as a function of distance from its beginning. It is also disclosed that the ratio of maximum width of the third zone to the maximum width of the second zone is from 2:1 to 20:1.

SUMMARY OF THE INVENTION

In one aspect, the present invention is a process for devolatilizing a polymer. The process of the present invention includes passing the polymer through a devolatizer. The devolatizer includes a plate heat exchanger wherein the plates of the plate heat exchanger are heated by a plurality of heating tubes. The heating tubes include a return tube nested inside of a supply tube.

In another aspect, the present invention is a plate heat exchanger including at least one heating plate and a plurality of heating tubes. The heating tubes are positioned such that they can heat the heating plates using a heat transfer fluid flowing through the heating tubes. The heating tubes include a return tube nested inside of a supply tube.

BRIEF DESCRIPTION OF THE DRAWINGS

For a detailed understanding and better appreciation of the present invention, reference should be made to the following detailed description of the invention and the preferred embodiments, taken in conjunction with the accompanying drawings, wherein.

DETAILED DESCRIPTION OF INVENTION

In one aspect the present invention is a process for devolatilizing a polymer. The polymers for which the process of the present invention is useful include any that have a volatile component that is desirable removed by devolatilization. Examples of such polymers include thermoplastic polymers, silicone polymers, elastomers, lubricants, and the like. Mixtures of these can also be devolatized.

The term thermoplastic polymers, as used herein, includes polymers that become plastic and flow because of heat and pressure. Examples of such thermoplastic polymers include polystyrene, impact-resistant polystyrene, polyphenylene ethers, polycarbonates, polyvinyl chloride, polyurethanes, polyetherimides, polyamides, polyesters, polyacrylates and polymethacrylates, linear polyethylene, their copolymers such as the styrene-acrylonitrile (ASA or SAN), styrene methyl-methacrylate, styrene maleic-anhydride, styrene-acrylonitrile rubber such as ABS or AES, styrene-methyl-methacrylate-rubber and the like, as well as mixtures of such polymers and copolymers, such as for instances polyphenylene-ether polystyrene and the like.

Examples of elastomers useful with the process of the present invention include diene rubbers, such as polybutadiene, polyisoprene, butylene rubbers, polyisobutylene, ethylene-propylene rubbers, and ethylene-propylene-diene (EPDM) rubbers; homopolymers of vinyl ethers, cyclic esters, methacrylic esters, acrylonitrile, and the like. As lubricants having a high molecular weight, the hydrocarbons are meant having a boiling point ranging from 370° C. to 550° C. and comprise n-paraffins, isoparaffins, cycloparaffins, and the like.

Polymer solutions to be subjected to the process of devolatilization of the present invention are the polymer solutions obtained directly by synthesis of the polymers and contain, besides the polymer, starting monomers or mixtures of monomers and solvents, particularly where the polymerization has been carried out in solution. Moreover, said solutions may contain mixtures of polymers and/or additives and/or fillers dissolved or dispersed in the solution.

The process of the present invention includes passing a polymer through a devolatizer comprising a plate heat exchanger wherein the plates of the plate heat exchanger are heated by a plurality of heating tubes and wherein the heating tube comprises a return tube nested inside of a supply tube. An advantage of the present invention over the prior art is that the prior art heating tubes are not nested. The difference results in a plate heat exchanger that is not as efficient and more difficult to control than an exchanger of the present invention.

Figure 1:
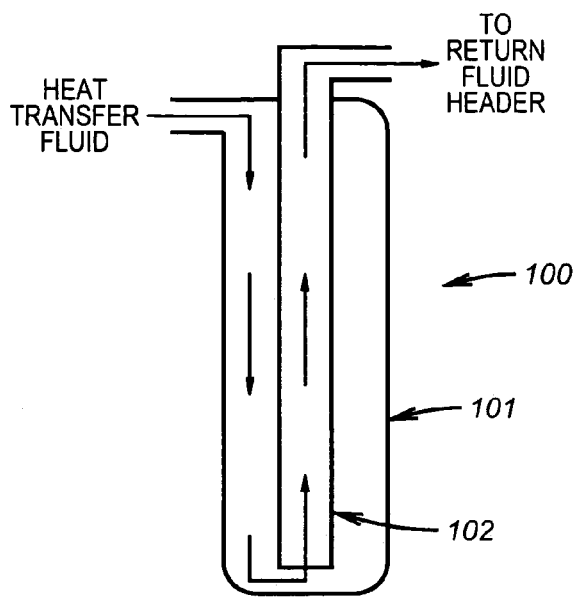
FIG. 1 is a schematic representation of a heating tube of the present invention.

In FIG. 1, a heating tube of the present invention is graphically represented wherein the heating tube is designated 100, the supply tube is designated 101, and the return tube is designated 102. In the practice of the method of the present invention, a heat transfer fluid passes first into the supply tube and travels down through the annulus between the interior of the supply tube and exterior of the return tube. The heat transfer fluid can conductively heat any object in contact with the tube, such as, for example, a heating plate.

In one embodiment of the present invention, the return tube 102 can be prepared using a nonconductive material. One advantage to this embodiment of the present invention is that by conductively isolating the returning heat transfer fluid from the supply side transfer fluid, the loss of heat to the relatively cool returning heat transfer fluid can be mitigated.

Figure 2:
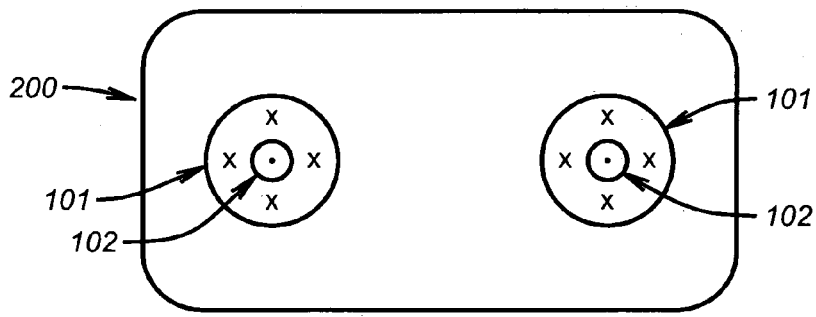
FIG. 2 is a cross sectional view of a heating tube of the present invention in contact with a heating plate.

FIG. 2 is a cross sectional view of a heating tube of the present invention 100 in contact with a heating plate 200. In this perspective, the front of the plane of the represents the top side of the exchanger, that is the same side as where the polymer enters the exchanger. The supply tube 101 receives and then carries heat transfer fluid wherein the relatively hot heat transfer fluid is in contact with inner surface of the supply tube. Heat is conducted from the heat transfer fluid into the heating plate. Upon reaching the bottom of the tube, the heat transfer fluid has lost at least a part of the heat it carried to the heating plate. This relatively cool heat transfer fluid then enters the return tube 102 and passes out of the heating tube. In this embodiment, there is a second tube of the present invention, but in the practice of the present invention, two or even more heating tubes can be in contact with the same heating plate. In either embodiment, the plate heat exchangers of the present invention have a more uniform heat profile across the surface of the heating plate than a similar prior art exchanger.

Figure 3:
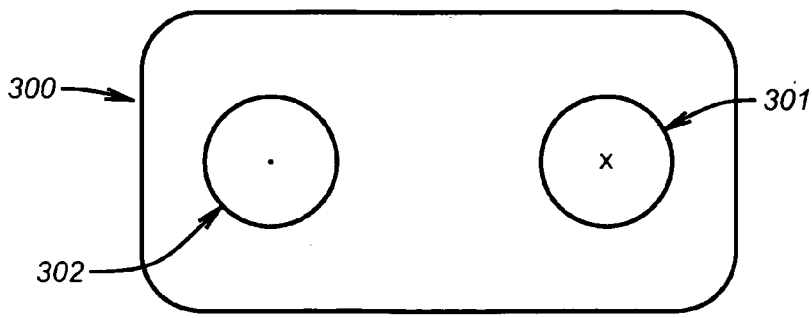
FIG. 3 is a cross sectional view of a prior art heating tube in contact with a heating plate.

The plate heat exchangers of the prior art differ from the plate heat exchangers of the present invention is several ways. In FIG. 3, a cross sectional view of a prior art heating tube having the same perspectives FIG. 2 is shown. The prior art heating tube is a loop with a supply side 301 and a return side 302, both of which are in contact with the heating plate. In the prior art plate heat exchanger, the hot heat transfer fluid travels down the supply leg of the continuous heating tube, imparting heat to the plate. At the base of the heat exchanger, the comparatively cool heat transfer fluid passes up through the plates creating a temperature gradient in the heating plate between supply side 301 and a return side 302.

The plate heat exchanger of the present invention can be more energy efficient than the prior art plate heat exchangers. The prior art heat exchangers can impart heat to the heating plates on the supply side of the plate and, dependent upon flow rates and heat capacities of the materials being heated, undesirably remove heat from the plates on the return side. This aspect of the prior art could require the waste of energy in that extra heat would have to be imparted to the heat transfer fluid to achieve the desired heating of the polymer and that extra energy would be subject to increased loss due to inefficiencies in heating the heat transfer fluid and heat conductivity losses in the rest of the fluid handling system.

Another advantage of the method of the present invention can be observed when heating heat sensitive polymers. Since the plates of the plate heat exchangers of the present invention have a much more uniform distribution of heat across the plate, there is a much lower possibility that the polymer will come into contact with a section of the plate having a too high temperature which can result in undesirable properties or degradation in the polymer. The chances of this are less because the more uniform the heat profile of the heating plate, the smaller the temperature differential on the surface of the plate necessary to achieve an average temperature.

In one embodiment, the present invention is used to devolatize impact resistant polystyrene, which is often referred to as high impact polystyrene. When devolatizing such a polymer, it can be preferable to both remove unreacted styrene monomer, while maintaining the swell index of the polymer as a comparatively high value. High impact polystyrene consists of a continuous polystyrene phase and a discontinuous rubber phase. The swell index of high impact polystyrene is a measure of the amount of polystyrene contained within the rubber phase. The present invention is particularly suitable for removing residual monomer from high impact polystyrene with minimal reductions in swell index.

Yet another advantage of the process of the present invention is that the plate heat exchangers can be modified more easily than prior art exchangers. Since the heating tubes of the prior art exchangers are loops, the heating plates used therewith had two basic configurations. In a first configuration, the plates had two holes, one for the supply slide and one for the return side of each heating tube. In this configuration, the exchanger had to be disassembled and the heating tube removed from the supply and return headers to add or remove heating plates. In an alternative embodiment, the heating plates are constructed like a clamshell and have to be opened to be removed removed.

In the practice of the process of the present invention, the heating tubes are, in one embodiment, a single cylinder and therefore plates can be added or removed without the necessity of disconnecting the heating tubes from the header system. This advantage makes the plate heat exchangers of the present invention particularly useful in pilot plant and other operations where there are frequent process changes. This advantage can result in lower maintenance costs and less down time, which is often very desirable in an industrial setting.

In addition to the embodiments already described, the plate heat exchangers can be used in combination such that some of the heating tubes are partially shielded from conducting heat to some of the plates in the exchanger. In this way, a more uniform temperature profile along the length of the exchanger could also be created. For example, in a heat exchanger having four heating tubes, two of the tubes could be conductively connected to the top half of the heating plates and the other two heating tubes could be conductively connected to the bottom half of the heating plates. This could result in an exchanger having a much smaller temperature differential between the top and the bottom of the heat exchanger.

While for heating, it is more efficient for the supply tube to be the outer tube and the return to be the inner tube, it would be obvious to one of ordinary skill in the art that this could be reversed and most of the benefits of the present invention retained. For this reason, this embodiment is also within the scope of the present invention. When the plate heat exchanger of the present invention is used to cool rather than heat, this embodiment could be more efficient and is also within the scope of the present invention.

Heat transfer fluids useful with the present invention include any that those of ordinary skill in the art of heating or cooling know to be useful. For example, heat transfer fluids useful with the method of the present invention include air, nitrogen, water, oil, glycols, and mixtures thereof. Any fluid capable of acting as a heat transfer fluid that flows as a result of gravity or pressure can be used with method of the present invention. In the practice of the present invention, the heat transfer fluid moves through the heating tubes due to a pressure differential between the supply tube and the return tube such that the heat transfer fluid flows from the supply tube and into the return tube.

The plate heat exchanges of the present invention can be prepared using any material that is suitable for their intended use. For example, in applications where a polymer is to be heated, it can be desirable to avoid certain metals that can either impart color or prevent color from developing. Metals that have catalytic effects should be avoided if such catalysis can result in undesirable properties. Where high heat conductivity is desired, a material having that property can be selected. In one embodiment, the plate heat exchangers of the present invention are prepared using carbon steel, stainless steel, and aluminum. Where high temperature service or corrosive services is desired, the plate heat exchangers of the present invention can be prepared using tantalum, hastelloy and monel. Combinations of metals can also be used. Any metal known to those of ordinary skill in the art of preparing heat exchangers to be useful can be used with the present invention. The process of the present invention and the plate heat exchangers of the present invention can be used having any geometry known to be useful in heating fluids.

In addition to the components discussed, the heat exchangers also include the prior art components known to those of ordinary skill in the art of using heat exchanges for applications such as devolatilization. For example, in some instances, it may be desirable to exclude oxygen from the heating process. In other instances, it may be desirable to place the polymer under a vacuum while it is being heated. In one embodiment of the present invention, the heating tubes of the present invention are connected to a common supply header and a common return header. In another embodiment, the tubes of the present invention are connected to a plurality of supply headers and a plurality of return headers.

The plate heat exchangers of the present invention can be used to heat or cool viscous fluids. In one embodiment, the materials being heated with the process of the present invention have from about 40 to about 5 percent volatiles prior to being devolatilized and from about 10,000 to 100 ppm volatiles after being devolatilized.

EXAMPLES

The following examples are provided to illustrate the present invention. The examples are not intended to limit the scope of the present invention and they should not be so interpreted. Amounts are in weight parts or weight percentages unless otherwise indicated.

Examples 1-4

A devolatizer having a plate heat exchanger is used to devolatize an impact polystyrene having the commercial trade designation LACQRENE® 4440. The plates of the plate heat exchanger are heated by four heating tubes. The heating tubes each have a return tube nested inside of a supply tube. The diameter of the supply tubes is 1 inch (2.54 cm) and the diameter of the return tube is 0.5 inches (1.27 cm). The walls of both tubes are 0.035 inches (0.9 mm). All four of the supply tubes share a common header. All four of the return tubes share a common header having a lower pressure than the supply header.

Placed into contact with the heating tubes is a combination of a set of washers (4) and a heating plate. For the described examples 24 combinations of a plate and a set of washers were used. The washers have an internal diameter of 1 inch [2.5 cm], and an external diameter of 1.25 inches [3.2 mm], and a thickness of 0.125 inches [32 mm]. Each set of washers is inserted directly onto the heating tubes. They are followed by a plate having an internal diameter of 2.5 inches [6.35], an external diameter of 5.5 inches [14 cm], and a thickness of 0.125 inches [32 mm]. Four holes are made in the plates to accommodate the heating tubes. When placed in an alternating sequence, each set of washers creates 4 channels, 0.125 inches [32 mm] in height in between the plates. Polymer delivered to the internal diameter of the plates is passed through the channels created by the washers.

The plates and heating tubes are in a heat exchanger body. The outer diameter of the heat exchanger body is 5.5 inches (14 cm). The length of the body of the heat exchanger is 24 inches (61 cm). The interior of heat exchanger body has a diverter cone at the bottom. The diverter cone is pitched to a 60° angle and is 2.5 inches (6.4 cm) wide and 2.16 inches (5.5 cm) high. The material to be volatilized passes into the body of the heat exchanger and across the plates. The devolatized polymer and the volatile components exit the heat exchanger as separate streams.

The polymer, prior to entering the heat exchanger has a volatile content of approximately 1500 ppm. The polymer is passed through the exchanger under the conditions set forth in the table. The polymer, after passing through the heat exchanger, is tested for volatiles content and swell index. The results are displayed in the table.

The swell index of impact polystyrene is determined as the ratio of weight of the swollen polymer extracted with toluene to the weight of the dried polymer. The swell index is determined using the Procedure. The residual styrene content is determined by gas chromatography and is reported as ppm.

Procedure

1. Place a clean, dry 50 ml stainless steel centrifuge tube in the tube holder. Tube holder is designed to keep the tube upright. Weigh the centrifuge tube and cap on the analytical balance. Record the weight (w1) to 0.0001 g, the number of the centrifuge tube and cap letter.
2. Weigh (w2) about 1.0 g of polymer to 0.0001 g in the previously weighed centrifuge tube. The sample weight of samples with small rubber particle size may be reduced to about 0.5 g.
3. Add a magnetic stirrer to tube. Place the tube on magnetic stand inside a 200 ml tall form beaker for support and start to stir the dry sample. Slowly add 40 ml of toluene to the centrifuge tube. Stir the sample for a minimum of 12 hours.
4. Centrifuge for one-half (½) hour at about 19,500 rpm.
5. After centrifuging the sample, carefully decant the supernatant solution and add fresh toluene (about 35 ml) to the remaining solid.
6. Stir for ½ hour using a glass stir rod to loosen stir bar and polymer.
7. Centrifuge a second time under the same conditions.
8. Repeat the extraction. Remove the stir bar and centrifuge one more time.
9. Decant the solvent. Let the tube stand for 10 minutes.
10. Weigh (w3) the tube containing the swollen polymer.
11. Dry the centrifuge tube and the polymer overnight in a 60° C. oven under vacuum.
12. Allow cooling to room temperature. Weigh (w4) the tube containing dried polymer.
13. Calculate swelling index as being equal to: (w3−w1)/(w4−w1)
14. Report to two decimal places.

TABLE

| Example # | Temperature | Flow Rate Lb/hr (kg/hr) | Pressure Torr (kPa) | Swell Index | Residual Styrene ppm |
|---|---|---|---|---|---|
| 1 | 420 | 80 (36.3) | 25 (3.3) | 11.70 | 350 |
| 2 | 440 | 80 (36.3) | 25 (3.3) | 11.15 | 340 |
| 3 | 460 | 80 (36.3) | 25 (3.3) | 10.65 | 260 |
| 4 | 480 | 80 (36.3) | 25 (3.3) | 10.20 | 290 |

What is claimed is:

1. A process comprising:
passing a polymer through a devolatilizer comprising a plate heat exchanger, wherein the plates of the beat exchanger are heated by a plurality of heating tubes and wherein each of the heating tubes comprises a return tube nested inside of a supply tube;
introducing a heat transfer fluid into the supply tube;
passing the heat transfer fluid from the supply tube to the return tube; and
withdrawing the heat transfer fluid from the return tube.

2. The process of Claim 1, wherein there is a pressure differential between the supply tube and the return tube such that the heat transfer fluid flows from the supply tube and into the return tube.

3. The process of Claim 1 wherein the polymer comprises from about 40 to about 5 percent volatiles prior to being devolatilized.

4. The process of Claim 1 wherein the polymer comprises from about 10,000 to 100 ppm volatiles after being devolatilized.

5. The process of Claim 1 wherein the polymer is selected from the group consisting of thermoplastic polymers, silicone polymers, elastomers, lubricants, and mixtures thereof.

6. The process of Claim 5 wherein the polymer is a thermoplastic polymer selected from the group consisting of polystyrene, polyphenylene ethers, polycarbonates, polyvinyl chloride, polyurethanes polyetherimides, polyamides, polyesters, polyacrylates and polymethacrylates, linear polyethylene, and their copolymers, styrene methyl-methacrylate, styrene maleic-anhydride, styrene-acrylonitrile rubber and styrene-methyl-methacrylate-rubber and mixtures thereof.

7. The process of Claim 6 wherein the polymer is impact-resistant polystyrene.

8. The process of Claim 5 wherein the polymer is an elastomer selected from the group consisting of polybutadiene, polyisoprene, butylene rubbers, polyisobutylene, ethylene-propylene rubbers, and ethylene-propylene-diene (EPDM) rubbers; homopolymers of vinyl ethers, cyclic esters, methacrylic esters, acrylonitrile, and mixtures thereof.

9. The process of Claim 1 further comprising forming the plate heat exchanger from a metal selected from the group consisting of carbon steel, stainless steel, aluminum, and combinations thereof.

10. The process of Claim 1 wherein each plate of the plate heat exchanger is in contact with no more than one heating tube.

11. The process of Claim 1 wherein at least some of the plates of the plate heat exchanger are in contact with at least two heating tubes.

12. The process of Claim 1 wherein the heat transfer fluid is selected from Ike group consisting of air, nitrogen, water, oil, glycols, and mixtures thereof.

13. The process of Claim 12 wherein the heat transfer fluid is water in the form of steam.

14. The process of Claim 12 wherein the heat transfer fluid is oil.

15. The process of Claim 1, wherein the heat transfer fluid passing through the supply tube has a temperature that is greater than a temperature of the heat transfer fluid passing through the return tube.

* * * * *